US011073126B2

(12) United States Patent
Bonfiglio

(10) Patent No.: US 11,073,126 B2
(45) Date of Patent: Jul. 27, 2021

(54) DEVICE FOR GENERATING ELECTRIC ENERGY FROM A PRESSURIZED FLUID

(71) Applicant: Infinity Electric Energy S.R.L., Milano (IT)

(72) Inventor: Ludovico Bonfiglio, Milan (IT)

(73) Assignee: INFINITY ELECTRIC ENERGY S.R.L., Milan (IT)

( * ) Notice: Subject to any disclaimer, the term of this patent is extended or adjusted under 35 U.S.C. 154(b) by 252 days.

(21) Appl. No.: 16/321,716

(22) PCT Filed: Aug. 4, 2017

(86) PCT No.: PCT/IB2017/054797
§ 371 (c)(1),
(2) Date: Jan. 29, 2019

(87) PCT Pub. No.: WO2018/025240
PCT Pub. Date: Feb. 8, 2018

(65) Prior Publication Data
US 2020/0347819 A1   Nov. 5, 2020

(30) Foreign Application Priority Data

Aug. 5, 2016  (IT) .................. 102016000082973

(51) Int. Cl.
*F03B 17/06* (2006.01)
*H02K 7/08* (2006.01)
*H02K 7/18* (2006.01)

(52) U.S. Cl.
CPC ............. *F03B 17/06* (2013.01); *H02K 7/088* (2013.01); *H02K 7/1823* (2013.01); *F05B 2250/141* (2013.01)

(58) Field of Classification Search
CPC .......... F03B 17/06; F03B 17/00; F03B 13/00; H02K 7/088; H02K 7/1823; H02K 21/14;
(Continued)

(56) References Cited

U.S. PATENT DOCUMENTS 3,187,191 A    6/1965  Bags
3,496,871 A *  2/1970  Stengel ................. F04B 19/003
                                                         417/410.1
(Continued)

FOREIGN PATENT DOCUMENTS

DE    102006043343 A1    3/2008
DE    102008036215 A1    2/2010
(Continued)

OTHER PUBLICATIONS

PCT International Search Report and Written Opinion dated Nov. 7, 2017 for International Application No. PCT/IB2017/054797, from which the instant application is based, 9 pgs.

(Continued)

*Primary Examiner* — Charles Reid, Jr.
(74) *Attorney, Agent, or Firm* — Fredrikson & Byron, P.A.

(57) ABSTRACT

A device (1) is provided for generating electric energy from a pressurized fluid (4) including a stator (2), which includes a tubular body on which a solenoid (21) is wound, and a rotor (3) mobile housed inside the tubular body of the stator (2). The rotor (3) includes a ring-shaped support element (6) and a plurality of hydraulic blades (57) each provided with a respective magnet (5) and mounted on the supporting element (6), integral with it. The rotor (3) is rotated within the tubular body of the stator (2) by the pressurized fluid (4) entering the device (1), so that the magnets (5) of the hydraulic blades (57) generate a magnetic field (22) which induces electric energy in the solenoid (21) of the stator (2).

21 Claims, 7 Drawing Sheets

(58) Field of Classification Search
CPC . H02K 7/14; F05B 2250/141; F05B 2220/60; F05B 2220/707; Y02B 10/50; Y02E 10/20; F01C 13/06; F01C 12/08; F01C 13/00
USPC .................................................. 290/54, 43
See application file for complete search history.

(56) References Cited

U.S. PATENT DOCUMENTS

| | | | |
|---|---|---|---|
| 2002/0047425 A1* | 4/2002 | Coupart | H02K 7/1021 310/156.01 |
| 2005/0151375 A1* | 7/2005 | Cheung | H02K 7/1846 290/1 R |
| 2006/0163970 A1* | 7/2006 | Caddell | F01C 1/06 310/267 |
| 2006/0202483 A1* | 9/2006 | Gonzalez | F03B 13/24 290/53 |
| 2006/0226728 A1* | 10/2006 | Pal | H02K 7/1884 310/180 |
| 2013/0113216 A1* | 5/2013 | Shrosbree | F17D 1/08 290/54 |
| 2013/0162057 A1 | 6/2013 | Turner | |

FOREIGN PATENT DOCUMENTS

| | | |
|---|---|---|
| FR | 3025950 A1 | 3/2016 |
| WO | 2010015360 A2 | 2/2011 |
| WO | 2013088436 A1 | 6/2013 |

OTHER PUBLICATIONS

Italian Search Report dated May 31, 2017 for related IT Application No. 201600082973, 2 pgs.

* cited by examiner

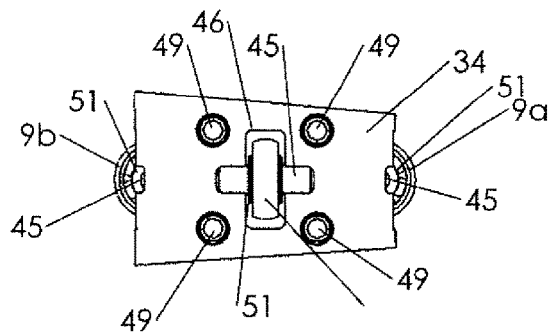
Fig. 5
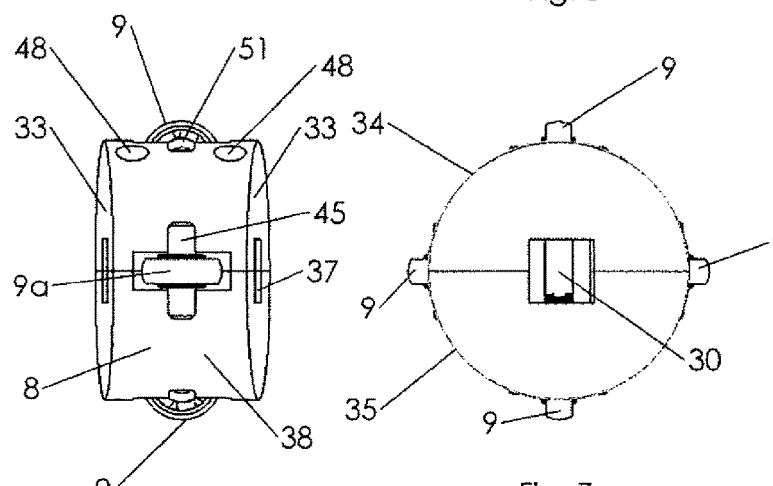
Fig. 6
Fig. 7
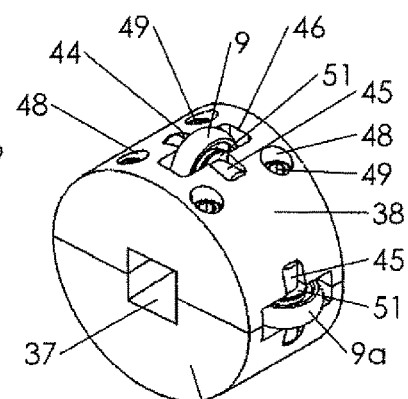
Fig. 8
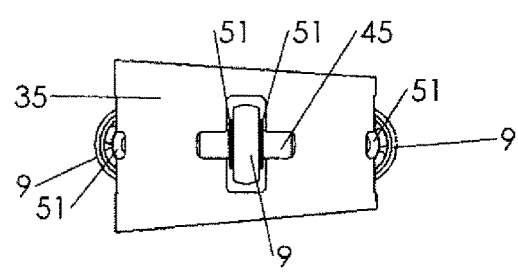
Fig. 9

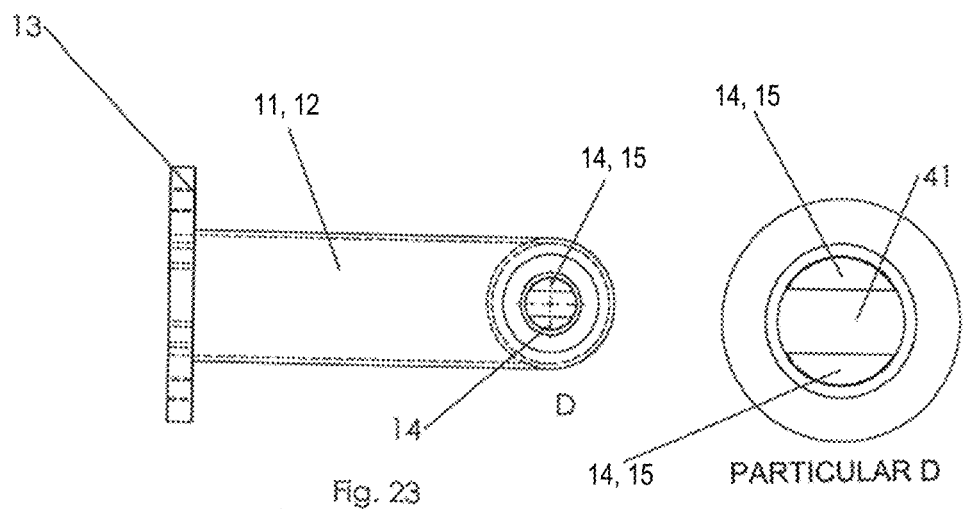
Fig. 23
PARTICULAR D
Fig. 24
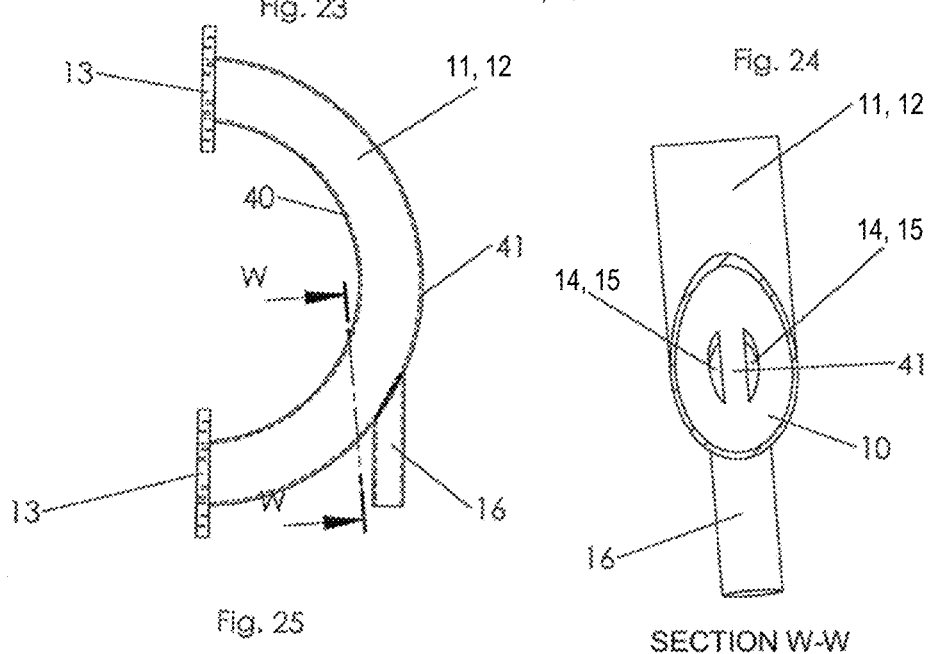
Fig. 25
SECTION W-W
Fig. 26

DEVICE FOR GENERATING ELECTRIC ENERGY FROM A PRESSURIZED FLUID

RELATED APPLICATIONS

This application is a 35 U.S.C. 371 national stage filing from International Application No. PCT/IB2017/054797, filed Aug. 4, 2017, which claims priority to Italian Application No. 102016000082973, filed Aug. 5, 2016, the teachings of which are incorporated herein by reference.

FIELD OF THE INVENTION

The present invention relates to a multifunctional device for producing/generating electric energy from the energy of pressurized fluids such as compressed air, compressed gas, water or steam under pressure, and describes methods of using such a device as a reversible device, which can also be used as a high pressure pump or compressor of a fluid.

Climate changes and the continuing decrease in conventional energy resources, as well as the geopolitical problems of oil and gas owners, are becoming a crucial point for all governments that have joined the Kyoto Protocol and the various international agreements for reducing "CO2"—carbon dioxide emission.

An electric generator is a device designed to produce electric energy starting from a different form of energy.

Compressed air is compressed atmospheric air, i.e. reduced by volume through a reciprocating compressor or a pump, and stored in a tank or high pressure cylinders that can reach over 750 bar of pressure. Afterwards, all this stored energy can be released for the various possible uses, for example: for tire dealer pneumatic tools for screwing/unscrewing wheel bolts; for pneumatic hammers to demolish roads and concrete structures, etc. Compressed air is also used to drive compressed air motors, where the expansion of the high pressure air entering the cylinders lowers the pistons, which are connected to a motor shaft and transform, with other pistons, a movement from vertical to rotating, thereby generating the movement of a vehicle, or producing electric energy, in the case of a generator.

Pressurized water coming from pipes of dams or basins goes out of the pipes placed on the bottom with a high pressure and when it is introduced into hydraulic turbines such as the Kaplan, Francis or Pelton turbine etc., it can generate a lot of hydroelectric power, called renewable energy. In addition, very high pressure water, having a pressure even greater than 500 bar, which is produced by car wash compressors, generates a strong jet to wash the car. Such very high pressure water, when supplied into hydraulic turbines, generates electric energy.

Gas that travels in pipelines, called gas pipelines, which from Russia, Norway or Libya or other supplier countries bring gas to Europe and Italy and into our homes, travels in large diameter pipes and at very high pressure of about 180 bar. Such high pressures are reduced in the gas sorting terminals, by using, for example, gas pressure reduction valves, so as to reach the final use site at a pressure of about 0.003 bar.

Moreover, steam generated in large quantities by boiling water at over 100° C. can be supplied into pipes, which transport the high pressure steam to steam turbines, which are connected to generators and generate a lot of electric energy. This is the case for thermoelectric or thermonuclear power plants.

As is known, a solenoid consists of a copper wire wound to form a plurality of helical turns, called winding. If the helical turns are wound on a toroid, it is referred to as a toroidal solenoid. Applying an electric current at the ends of the winding generates a magnetic field South North passing through the solenoid and in the same way a magnetic field outside the solenoid, where the North and South can be varied depending on the electrical current applied to the ends of the wire has either a positive sign or a negative sign. In the case of a toroidal solenoid, the magnetic field generated by the current flowing in the winding is present only within the solenoid. Electromagnetic induction is generated when a conductive wire moves inside a magnetic field or, vice versa, when a magnet moves inside a winding. Likewise, a solenoid is induced electromagnetically when a magnet is introduced inside it and there will be an electric current passage that will be as greater as faster the magnet displacement will be.

SUMMARY OF THE INVENTION

The main object of the present invention is therefore to provide a device for generating/producing electric energy, which converts the energy of a pressurized fluid, whether compressed air, pressurized gas, steam or pressurized water in the form of a force or thrust suitable for moving magnets, so as to induce a rotary and continuous magnetic field inside a toroidal solenoid thereby generating electric energy.

Within the scope of this technical task, the object of the invention is to provide a device that is capable of operating properly while maintaining the safety standards when used.

Another object of the invention is to provide a device that can withstand even high pressures, without damaging.

A further object of the invention is to provide a device that is very compact and can be supplied with any fluid; such as compressed air or compressed gas or compressed water, and used on any terrestrial, naval, aerial or spatial vehicle to generate electric energy on board of the vehicle itself.

A further object of the invention is to provide a device for generating electric energy having any size and power and which can be powered by any fluid such as compressed air or compressed gas or pressurized water, to produce enough electric energy to power batteries or accumulation systems, or electric motors and/or electric systems or lighting systems, for any home, building, industry, country or city.

A further object of the invention is to provide a reversible device that acts as a high pressure compressor or pump when it is powered by electric current and is applicable to any fluid, liquid or gaseous, such as air, gas or water, which when compressed by the device according to the invention, can supply accumulation systems, such as high pressure cylinders or liquid tanks, or can be used for their various uses such as high pressure cleaners, vacuum cleaners, etc.

A further object of the invention is to provide a device that can be replaced very quickly without interrupting the proper running of work for a long time.

A further object of the invention is to provide a device that is simple in the maintenance or replacement of parts.

Not last object of the invention is to provide a device for generating electric energy from a pressurized fluid, which is substantially simple and reliable.

These and other objects, which will be better apparent hereinafter, are achieved by a device for generating electric energy from a pressurized fluid according to claim 1. Other features of the present invention are also defined in the dependent claims 2 to 21.

BRIEF DESCRIPTION OF THE DRAWINGS

Further characteristics and advantages of the invention will become more apparent from the description of a preferred but non-exclusive embodiment of the device for generating electric energy according to the invention, illustrated by way of non-limiting example in the accompanying drawings, in which:

FIG. 5 is a top view of a bearing-holding carriage of the rotor of the device according to the invention;

FIG. 6 is a perspective view of the bearing-holding carriage of FIG. 5;

FIG. 7 is a front view of the bearing-holding carriage of FIG. 5;

FIG. 8 is a further perspective view of the bearing-holding carriage of FIG. 5;

FIG. 9 is a bottom view of the bearing-holding carriage of FIG. 5;

FIG. 23 is a front view of a half tube of the stator tubular body of the device according to the invention;

FIG. 24 is a front view of the particular D of FIG. 23;

FIG. 25 is a top view of the half tube of FIG. 23; and

FIG. 26 is a cross-section view taken along the line W-W of FIG. 25.

DETAILED DESCRIPTION OF A PREFERRED EMBODIMENT OF THE INVENTION

Figure 1:
FIG. 1 is a perspective view of the device according to the invention.
Figure 2:
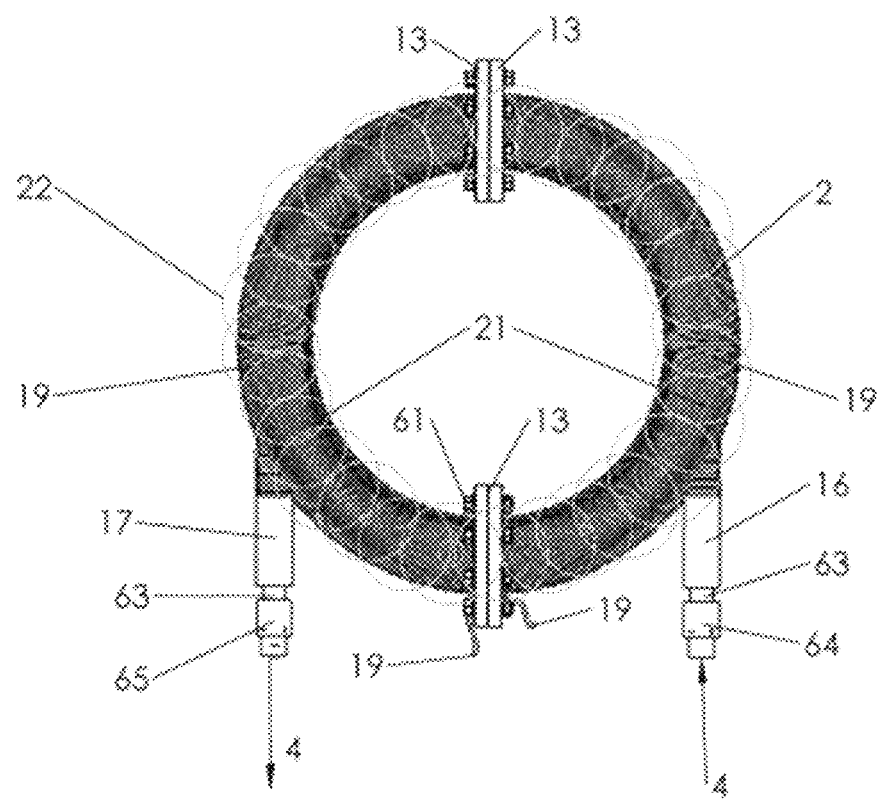
FIG. 2 is a top view of the device of FIG. 1.

With reference to the cited figures, they illustrate a device for generating electric energy starting from the energy of a pressurized fluid according to the present invention.

The device, indicated generally by the reference numeral 1, comprises a stator 2, which comprises a tubular body, preferably of toroidal shape, and a rotor 3 housed inside the tubular body of the stator 2.

The rotor 3 has the shape of a ring or circle and rotates inside the toroidal tubular body of the stator 2 pushed by the pressure of a fluid 4, which is fed under pressure into the toroidal tubular body of the stator 2.

Figure 3:
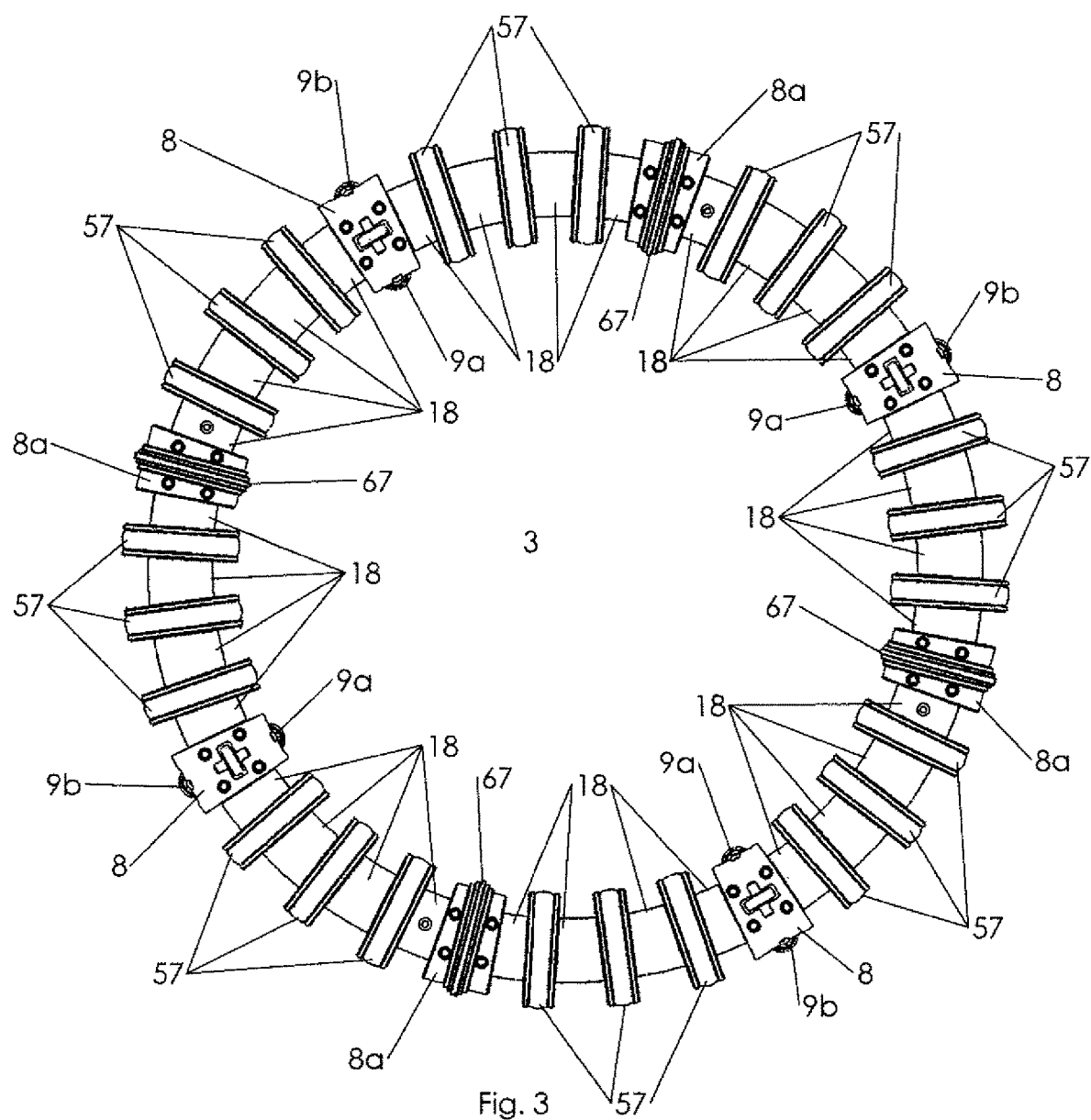
FIG. 3 is a top view of a rotor of the device of FIG. 1, in an operative configuration.
Figure 4:
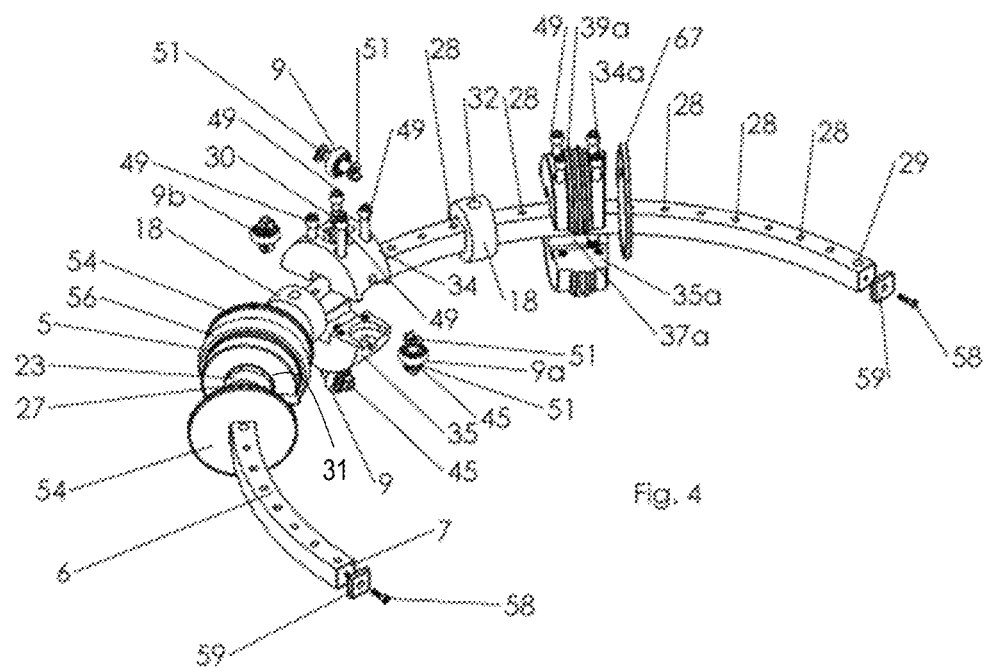
FIG. 4 is an exploded view of some components of the rotor of FIG. 3.
Figure 10:
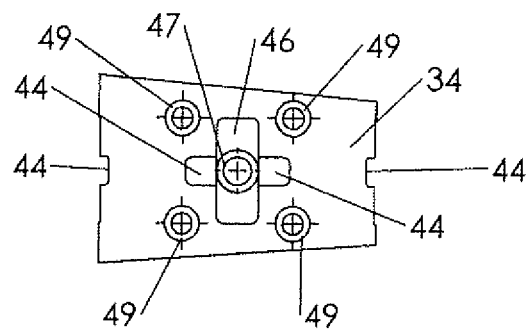
FIGS. 10 to 15 show top views of an upper portion and a lower portion of a bearing-holding carriage of the rotor of the device according to the invention.
Figure 11:
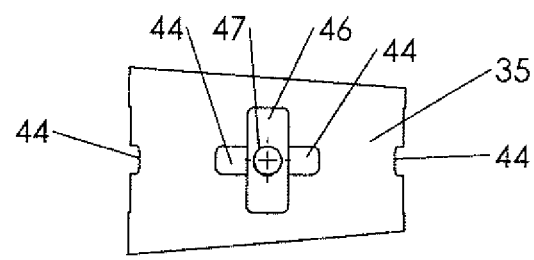
Figure 12:
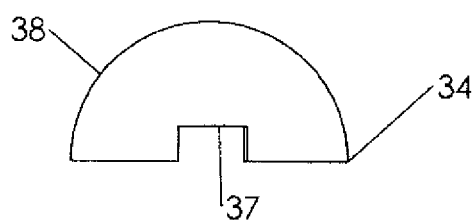
Figure 13:
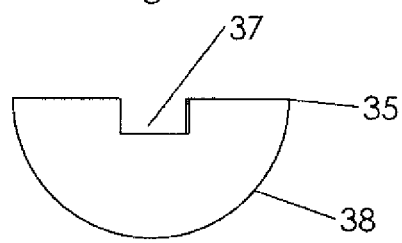
Figure 14:
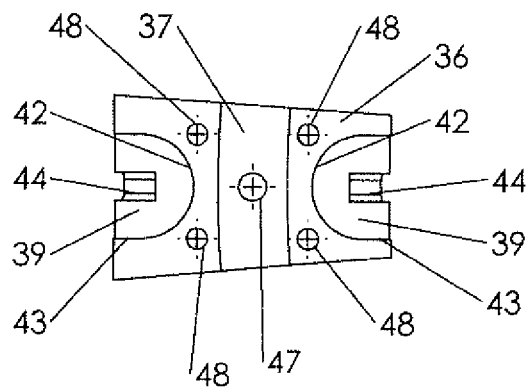
Figure 15:
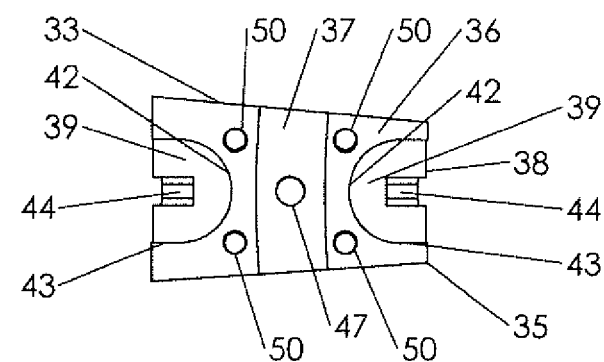
Figure 16:
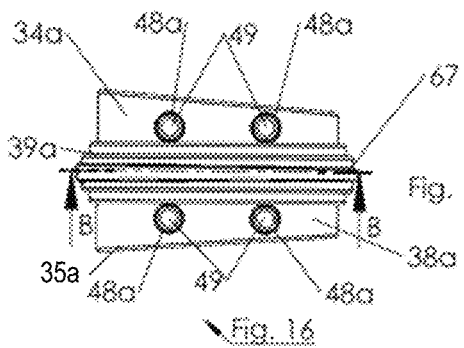
FIG. 16 is a top view of a band-holding carriage of the rotor of FIG. 2.
Figure 17:
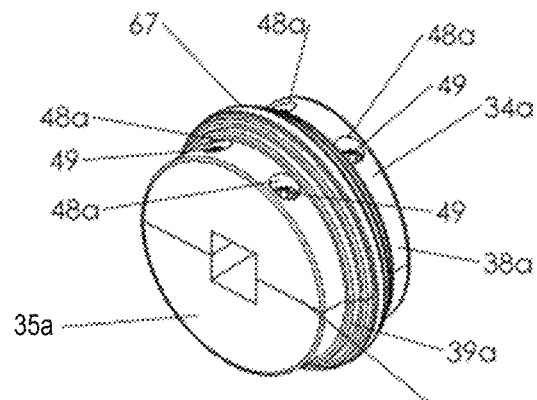
FIG. 17 is a perspective view of the band-holding carriage of FIG. 16.
Figure 18A:
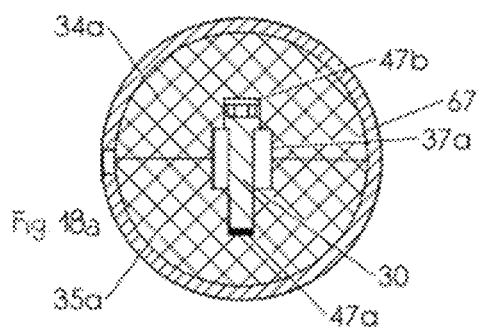
FIG. 18a is a cross-section view taken along the line B-B of FIG. 16.
Figure 18:
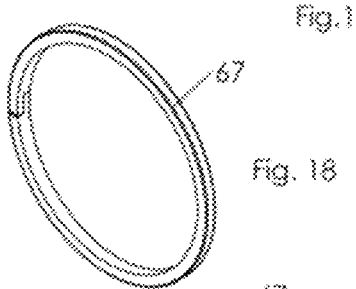
FIG. 18 is a perspective view of a band of the band-holding carriage of FIG. 16.
Figure 19:
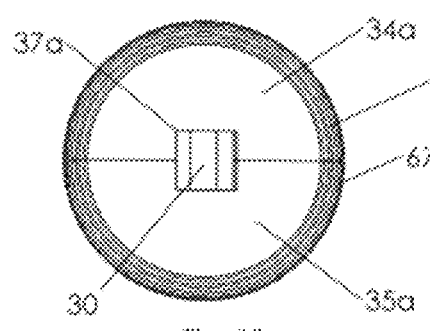
FIG. 19 is a plan view of the band-holding carriage of FIG. 16.

As shown in detail in FIGS. 3 and 4, the rotor 3 has a series of ferromagnetic hydraulic blades 57, from one blade to preferably twenty-four blades or more, each hydraulic blade being formed by a ring-shaped magnet 5 which is covered at the sides by metal disks 54. Magnets 5 of hydraulic blades 57 are made of neodymium or other magnetic or super magnetic material, and are supported by a support element 6 of the rotor 3, preferably consisting of two, three or four portions, preferably four portions, each curved at 90°, which connected together form a ring or circle. The rotor 3 further comprises a plurality of bearing-holding carriages 8, from a minimum of three to preferably eight bearing-holding carriages 8.

As shown in detail in FIGS. 5 to 9, each bearing-holding carriage 8 is provided with at least three or four bearings or wheels 9, which are externally placed, cross or "X"-shaped, and tangent to inner walls 10 of the toroidal tubular body of the stator 2. Such bearings or wheels 9 hold the rotor 3 centered, allowing it to slide, and then rotate the rotor 3 inside the toroidal tubular body of the stator 2.

With reference to FIGS. 1, 2 and 23 to 26, the toroidal tubular body of the stator 2 consists of two semi-circular hollow tubes, respectively a right half tube 11 and a left half tube 12. The right and left half tubes 11, 12 are made of stainless steel or very resistant material even at high pressures and corrosion, and are joined by means of four perforated flanges 13 which are welded at end portions of each right and left half tube 11, 12 such that once the flanges 13 are joined therebetween two by two, the half tubes 11, 12 form a ring or toroid.

In an alternative embodiment, not shown in the figures, the toroidal tubular body of the stator 2 consists of three hollow tubes each curved at 120° or, alternatively, four hollow tubes each curved at 90°, with the respective flanges welded at sides thereof. Correspondingly, the portions of the ring-shaped support element 6 of the rotor 3 have a radius of curvature equal to the radius of curvature of the hollow tubes of the tubular body of the toroidal stator 2 and preferably have a square section 7.

The pressurized fluid 4 enters the stator 2 at the right half tube 11 and exits the stator 2 at the left half tube 12. To this end, a fitting is present laterally on the outer surface of the right half tube 11, and a duct 16 is externally welded around two semi-elliptical holes 14, shown in FIG. 26, the fluid 4 entering under pressure into the stator 2 through the duct 16. Similarly, in the left half tube 12 there is another fitting and a second duct 17 is welded around other two semi-elliptical holes (not shown), the fluid 4 exiting the stator 2 through the duct 17 after pushing the rotor 3 to rotate inside the stator 2 by hitting with force the hydraulic blades 57. The metal disks 54 present on the hydraulic blades 57 protect the magnets 5 from the collision against the pressurized fluid 4. The rotor 3 will then rotate inside the toroidal stator 2 from the right half tube 11 to the left half tube 12, counterclockwise, if the inlet duct 16 of the fluid 4 is positioned down right, or clockwise if the inlet duct 16 of the fluid 4 is positioned top left. If the inlet and outlet ducts 16, 17 of the fluid 4 are instead top positioned, the rotor 3 will rotate clockwise if the inlet duct 16 of the fluid 4 is positioned at the top right and counterclockwise if the inlet duct 16 of the fluid 4 is positioned at the top left.

The inlet duct 16 of the fluid 4 and the outlet duct 17 of the fluid 4 are welded and asymmetrically joined to the stator 2 thereby forming a sort of "U"; they are parallel to each other and equidistant between the front surface and the rear surface of the stator 2 and parallel to the flat sides of the flanges 13 of the stator 2.

The hypothetical central axis of the inlet duct 16 of the fluid 4 and the hypothetical central axis of the outlet duct 17 of the fluid 4 are parallel therebetween and coincident with the hypothetical axes of the respective half tubes 11, 12 forming the tubular body of the stator 2, where there are the fittings described above, remaining perfectly centered on the outer surface of the two half tubes 11, 12.

In an alternative embodiment (not shown) the tubular body of the stator 2 has four straight tubes from which the fluid 4 enters and exits, two tubes having an inlet and an outlet of the fluid 4 and two tubes having an inlet and an outlet of the fluid 4, and all four straight tubes are parallel to each other so as to form two "U" superimposed, one of which is rotated 90° downwards.

On the outer surface of the stator 2, and therefore on the right half tube 11 and the left half tube 12, between the two flanges 13 of each half tube, an insulating material is wound and on the insulating material, all around each half tube 11, 12, a wire 19 is wound, which is made of conductive material, for example copper with high electrical conductivity, preferably glazed or coated with insulating material. In particular, the conductive wire 19 comprises a plurality of circular turns close to each other so as to form one or more coils, which together form a toroidal solenoid 21. Following rotation of the rotor 3 inside the stator 2 by the action of the pressurized fluid 4 entering the stator 2, the magnets 5 of the hydraulic blades 57 generate a magnetic field 22 which induces in the toroidal solenoid 21 an amount of electric energy, in the form of a direct current or an alternating current, greater than that generated in traditional electric generators.

Preferably, magnets 5 have all North South polarity in the same rotation direction of the rotor 3, so as to induce a positive direct current at the output of the toroidal solenoid 21.

In an alternative embodiment (not shown) all magnets 5 have South North polarity, or the position of the rotor 3 is inverted inside the stator 2. Thus, keeping the same rotation direction of the rotor 3, a negative direct current is obtained.

In a further alternative embodiment (not shown), in order to obtain alternating current from device 1, groups for example of three magnets 5 placed inside the ferromagnetic hydraulic blades 57 with South North polarity are alternated with groups of magnets 5 with opposite polarity North South. In this case, the toroidal solenoid 21 will consist of a series of coils, one for each group of magnets 5, with the coils associated with the groups of magnets having the same polarity being electrically connected therebetween.

As shown in detail in FIG. 4, magnets 5 of the hydraulic blades 57, having preferably a diameter lower than the diameter of the metal disks 54, are centered and mounted on the ring-shaped support element 6 by means of supports 23. Preferably, supports 23 have a thickness similar to that of magnets 5 and are cylindrical in shape and made of plastic or non-ferrous material. Each support 23 has a square or round shaped hole, which has the same square or rectangular cross-section of the ring-shaped support element 6 and an outer diameter corresponding to the inner diameter of the respective magnet 5. It results that each support 23 couples perfectly around the ring-shaped support element 6 and inside the respective magnet 5. Supports 23 of the magnets 5 have a further hole for receiving a screw 27 or pin for blocking the support 23 in corresponding through holes 28 formed in the ring-shaped support element 6.

In an alternative embodiment (not shown), some supports 23 of the magnets 5 may not have any upper hole crossing the cylindrical outer surface and therefore they are not blocked on the ring-shaped support element 6.

In each hydraulic blade 57, to protect magnet 5 from corrosion and the impact with the pressurized fluid 4, a protection ring 56 made of non-ferrous material or of highly resistant plastic material is inserted externally and all around the magnet 5. This protection ring 56 has the central hole having the same outer diameter of the magnet 5, which fits into the protection ring 56. The outer diameter of the protection ring 56 is equal to or slightly greater than the outer diameter of the metal disks 54 and is close to the inner walls 10 of the toroidal stator 2.

The two metal disks 54, whether of ferrous or non-ferrous material, the support 23 of the magnet 5 and the magnet 5, and the protection ring 56 which protects them, all together essentially constitute the ferromagnetic hydraulic blade 57, which is blocked on the ring-shaped support element 6 of the rotor 3, and all the hydraulic blades 57 are hit with force and pressure by the pressurized fluid 4, thereby rotating the rotor 3 at high speed. Following this rotation, magnets 5 of the hydraulic blades 57 generate a magnetic field 22, which induces in the solenoid 21 of the toroidal stator 2 an amount of electric energy greater than that produced by the conventional electric generators.

The ring-shaped support element 6 has a plurality of through holes 28, one for each support 23, and a plurality of through holes, one for each spacer 18 interposed between two subsequent blades 57 and blocked on the ring-shaped support element 6. The ring-shaped support element 6 has further threaded through holes 29 having a larger diameter than holes 28, within which a locking screw 30 of the bearing-holding carriages 8 on the ring-shaped support element 6 passes.

In an alternative embodiment (not shown) some through holes 29 are not threaded.

With reference to FIGS. 5 to 9, the bearing-holding carriages 8 are each formed by a cylinder with two oblique side sections with a certain degree of inclination, or side surfaces 33. The bearing-holding carriages 8 mounted on the ring-shaped support element 6 have the oblique section, side surfaces 33 facing the center of the ring-shaped support element 6. Moreover, the side surfaces 33 are cut according to the radius of the ring-shaped support element 6, which starts from the center of the ring-shaped support element or from the center of the stator 2.

In a different embodiment (not shown) the bearing-holding carriages 8 have no lateral oblique section, but are perfect cylinders split in half along their central axis.

Bearing-holding carriages 8 all have an outer diameter slightly lower than the inner diameter of the right half tube 11 and the left half tube 12 forming the toroidal stator 2. Bearing-holding carriages 8 support four or more bearings 9 and consist of two identical parts having the shape of a semi-cylinder, in particular an upper portion 34 and a lower portion 35, which are obtained by cutting the cylinder in two portions along its central axis. In this way, two internal flat surfaces 36 are obtained.

Inside the flat surface 36 of the upper portion 34 and the lower portion 35 of each bearing-holding carriage 8, a through cavity 37 is formed, preferably rectangular in section, which is curved with the same radius of the ring-shaped support element 6 and has a depth corresponding to the half square section 7 of the ring-shaped support element 6. The cavity 37 is adapted to receive the ring-shaped support element, which perfectly engages between the two upper and lower portions 34 and 35, which are joined and tightened by a screw 30.

On both lower and upper portions 35 and 34, at the center of the respective cavity 37, there is a through hole 47 to the outer curved surface 38 of the bearing-holding carriage 8, in which a screw 30 will be screwed, which will joint the upper portion 34 and the lower portion 35 on the ring-shaped support element 6 so as to block the bearing-holding carriage 8 by passing through the hole 29 on the ring-shaped support element 6.

On the flat surfaces 36 of the upper portion 34 and the lower portion 35 of the bearing-holding carriage 8, at the cavity 37, two specular "U"-shaped cavities 39 are formed, which together will contain two of the four bearings 9; namely the innermost bearing 9a with respect to the curved cavity 37 and the outermost bearing 9b with respect to the curved cavity 37.

The ring-shaped support element 6 is inserted within the cavity 37 of the bearing-holding carriage 8, which by means of the four bearings 9 will slide inside the tubular body of the toroidal stator 2 and, more specifically, on an innermost abutment surface 40, with the bearing 9a, and on an outermost abutment surface 41 with the bearing 9b. On the two flat surfaces 36 of the bearing-holding carriage 8, more internally near a hole 47, opposed to each other, there are two specular "U"-shaped cavities 39 excavated therein, which will contain part of the bearings 9a and 9b. More specifically, each cavity 39 is more internally formed by a cavity 42, which is of semicircle shape, and externally by a cavity 43, which is of rectangular shape. The two rectangular cavities 43 overstep the semi-cylindrical outer surface 38, both in the lower portion 35 and in the upper portion 34 of the bearing-holding carriage 8, thereby forming a rectangular hole once the upper portion 34 and the lower portion 35 are joined together. Exactly at the center of the two cavities 39 of the bearing-holding carriage 8, there are additional four rectangular cavities 44, passing through the curved outer surface 38 of the semi-cylinder of the bearing-holding carriage 8. These cavities 44 are as wide as the diameter of a pin 45 of the bearing 9. In each of the four cavities 44, the pin 45 supporting a bearing 9 will be partially inserted; more specifically, the bearing 9a in the innermost cavities and the bearing 9b in the outermost cavities with respect to the curved cavity 37.

The other two bearings 9 are inserted into a cavity 46 in the upper portion 34 of the bearing-holding carriage 8, and the other bearing is inserted into the cavity 46 placed in the lower portion 35 of the bearing-holding carriage 8. Both cavities 46 are of rectangular shape, centered and parallel to the hypothetical inner axis of the bearing-holding carriage 8. More specifically, the cavities 46 have a width slightly greater that the width of the bearing 9 and are slightly more deep than the radius of a bearing 9, so that the bearing 9 inserted inside the cavity 46 does not touch any of its walls. The four bearings 9 are centrally pivoted to their axis by the pin 45, and each pin 45 is inserted into the cavities 44 centrally formed at the sides of the cavities 46 and 39 on the outer cylindrical surface 38 of each bearing-holding carriage 8.

In the upper portion 34 of the bearing-holding carriage 8, four through flared holes 48 are symmetrically formed around the hole 47 and the cavity 46, perpendicular to the flat surface 36, with the respective flares positioned on the cylindrical surface 38. Each flared hole 48 is adapted to accommodate a respective screw 49, preferably of the allen type. Each screw is screwed at four threaded holes 50 provided on the lower portion 35 of the bearing-holding carriage 8, to better tighten the upper portion 34 and the lower portion 35 of each bearing-holding carriage 8 on the ring-shaped support element 6, thereby forming the bearing-holding carriage with the two joined portions 34 and 35.

In the bearing-holding carriage 8, each of the four bearings 9 has its two sides spaced from the walls of the cavity 46 by means of a particular washer 51 mounted on the pin 45 which, in addition to spacing the bearings 9 from the walls of the cavity 46 and of the cavity 39, avoids pins 45 from leaving their seat by locking them. The magnet 5 of each hydraulic blade 57 is also externally protected by a ring 56 made of non-ferrous material and, as described above, is covered at the sides by two metal disks 54, which protect it from the impact with the pressurized fluid entering the stator 2.

Between a bearing-holding carriage 8 and the other a spacer or separator 18 made of non-ferrous material and a ferromagnetic hydraulic blade 57 are alternately inserted, for a total of four spacers and three blades or even less, according to the number of bearing-holding carriages 8 and of hydraulic blades 57 forming the rotor 3. The spacers 18 prevent the blades 57 from attracting each other and the union of the blades the one with the other, meanwhile avoiding the pressure and thrust received by the hydraulic blade 57 to be discharged on the screw 27 or pin which blocks the support 23 of the blade 57 on the ring-shaped support element 6. The pressure and thrust is thus discharged also on the other spacers 18 of the magnets 5 close to the hydraulic blades 57 hit by the pressurized fluid 4. The separator 18 between two subsequent blades 57 is cylindrical in shape and has an outer diameter slightly greater than the central hole of the magnet 5 and a central hole 31 in which the ring-shaped support portion 6 supporting it in the rotor 3 is inserted. Moreover, sides of the separator 18 are inclined and parallel to the sides of the metal disks 54, the bearing-holding carriages 8 and to band-holding carriages 8a, which will be described later with reference to FIGS. 16 to 22. Moreover, each separator 18 has a lateral hole 32 passing through the cylindrical outer surface where the screw 27 is screwed, which screw passing through a respective hole 28 of the ring-shaped support element 6 will keep each separator 18 blocked on the ring-shaped support element 6 by also blocking the hydraulic blades 57 from sliding on the ring-shaped support element 6.

In an alternative embodiment (not shown), magnets 5 mounted on the supports 23 are not all separated by spacers 18, but some are joined together by attraction force, in groups of two or more magnets 5. This allows, advantageously, to increase the magnetic field 22, which will generate electric energy in the toroidal solenoid 21.

The metal disks 54 of the hydraulic blades 57 have a thickness of about two millimeters and are resistant to the impact with the pressurized fluid 4. In addition, each disk 54 has an outer diameter slightly lower than the inner diameter of the walls 10 of the tubular body of the toroidal stator 2, and in the center has a square hole of the same size as the square section of the ring-shaped support element 6. Alternatively, the hole may be circular; and in both cases the ring-shaped support element 6 will be inserted into the hole of each metal disk 54 by centering the metal disk 54 inside the tubular body of the stator 2. In an alternative embodiment (not shown), the metal disks 54 covering the magnets 5 at the sides are not of ferrous material but of non-magnetic material.

To facilitate assembling and disassembling the rotor 3 inside the toroidal stator 2, at respective ends of at least two portions of the ring-shaped support element 6, small square magnets 59 are fixed by means of screws 58, which magnets 59 joined together by magnetic attraction form the ring-shaped support element 6. In particular, the at least two portions of the ring-shaped support member 6 must support respective different bearing-holding carriages 8, two or three sets of hydraulic blades 57 and the spacers 18 between subsequent hydraulic blades 57.

On the ring-shaped support element 6 of the rotor band-holding carriages 8a 3 are also mounted, which are very similar to the bearing-holding carriages 8, from which they differ in that they do not have the bearings 9 centering them and supporting them by sliding inside the stator 2.

As shown in detail in FIGS. 16 to 22, each band-holding carriage 8a externally supports one or more elastic bands 67, similar to those of a piston of an internal combustion motor, which bands allowing the band-holding carriage 8a to slide within the right and left half tubes 11, 12 of the toroidal stator 2, meanwhile keeping centered all components of the rotor 3 described above. This advantageously increases the compression of the inlet pressurized fluid 4, which drives the rotor 3 to rotate without generating dispersions of the fluid 4 and, during rotation, a pressure between the walls 10 of the toroidal stator 2 and the elastic bands 67.

Figure 20:
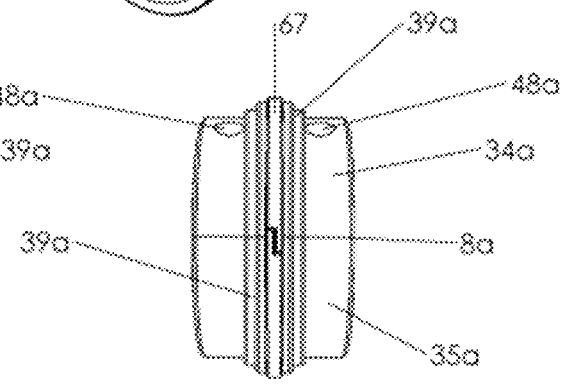
FIG. 20 is a side view of the band-holding carriage of FIG. 16.
Figure 21:
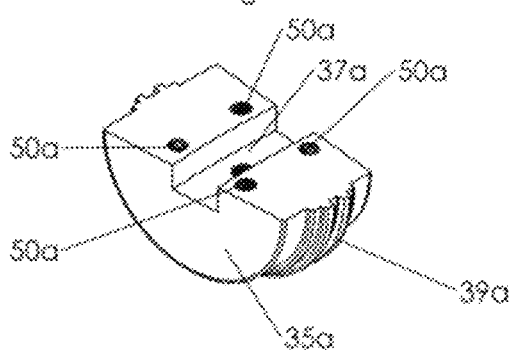
FIG. 21 is a perspective view of a lower portion of the band-holding carriage of FIG. 16.
Figure 22:
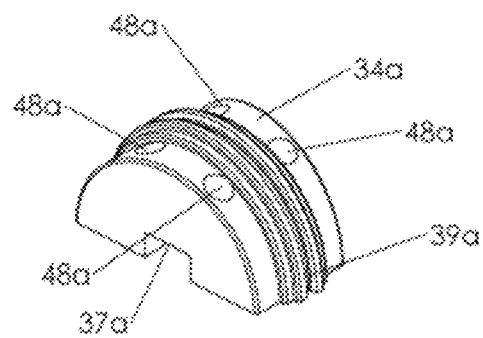
FIG. 22 is a perspective view of an upper portion of the band-holding carriage of FIG. 16.

The elastic band 67 is placed around a surface 38a and, as shown in FIG. 20, is located within four steps, 39a, scaled mirrored, centered in the middle of the carriage 8a, which hold the elastic band 67 so that it slides inside the toroidal stator 2 while keeping the pressure of the fluid 4 between the band-holding carriage 8a and the inner walls 10 of the stator 2.

The band-holding carriage 8a has an upper portion 34a and a lower portion 35a, delimiting a cavity 37a, identical to the cavity 37 of the bearing-holding carriage 8, in which the ring-shaped support element 6 is inserted.

As for the bearing-holding carriage 8, the two upper and lower portions 34a and 35a of the band-holding carriage 8a are joined by four screws or allen screws 49 passing through holes 48a of the upper portion 34a and are screwing into corresponding threaded holes 50a provided in the lower portion 35a of the band-holding carriage 8a. The screw 30 is screwed in the hole 47a in the lower portion 35a of the band-holding carriage 8a by securing the lower portion 35a in one of the threaded holes of the ring-shaped support element 6, while another central hole 47b provided in the upper portion 34a of the band-holding carriage 8a covers the head of the screw 30 that will interlock inside it.

In a different embodiment, depending on the fluid 4 being used as the drive thruster of the rotor 3, all or part of the bearing-holding carriages 8 can be replaced by corresponding band-holding carriages 8a.

The four coupling flanges 13 of the right and left half tubes 11, 12 forming the tubular body of the toroidal stator 2 are joined together by nuts and bolts 61 and washers. The bearings 9 of the bearing-holding carriages 8 supporting the rotor 3 will slide inside the stator 2. Bearings 9 must not strike on the inner edge of the right and left half tubes 11, 12 joined by the flanges 13, forming the toroidal stator 2, otherwise they may be damaged.

With reference back to FIG. 2, on the terminal end of the inlet duct 16 and the outlet duct 17 of the fluid 4, a respective collector 63 is welded, which has a threaded central hole, where an adapter can be inserted and screwed based on the type of fluid 4 one desires to use.

To prevent holes or steps or edges to be formed, against which the outer bearing 9b of the bearing-holding carriages 8 can hit, thus risking breaking or lowering the sliding speed of the carriages and of the whole rotor 3, instead of a central threaded hole at the collectors 63, a pair of holes 14 and 15 is provided respectively on the right half tube 11 and the left half tube 12 of the tubular body of the toroidal stator 2. These holes 14, 15 are made in such a way that the bearings 9b of the bearing-holding carriages 8 slide centrally between the two holes 14 and the two holes 15 on the inner surface 10 of the toroidal stator 2.

Preferably, a valve 64 is fixed to the collector 63 of the inlet duct 16 of the fluid 4. If open, the valve 64 controls the amount of fluid 4 which must enter the device 1 to generate electric energy. Alternatively, when, in another application, the device 1 will be used as a compressor, the valve 64 behaves as a non-return valve, preventing the compressed fluid 4 to enter again from the device 1 from where it entered, but forcing it to come out compressed only from the outlet duct 17 of the fluid 4.

Due to its particular configuration, the device 1 according to the present invention is of a reversible type. In other words, by applying electric energy to the terminations of the toroidal solenoid 21, the electromotive force which is induced on the permanent magnets 5 of the rotor 3 by the toroidal solenoid 21 turns the rotor 3, sucking and compressing the fluid 4, and the device 1 will act as a compressor or high pressure pump.

The operation of the device 1 for generating electric energy from a pressurized fluid according to the invention is apparent from what has been described and illustrated and in particular it is substantially the following.

In a first operating condition, the valve 64 connected to the collector 63 of the outlet duct 17 is open, so that the fluid 4 enters the duct 16, and from this passes into the toroidal stator 2 through the two holes 14 placed on the right half tube 11 of the tubular body. The pressurized fluid 4 hits almost perpendicularly with force and pushes the surface of the hydraulic blades 57 of the rotor 3, formed by the metal disks 54 and the magnets 5, also hitting the sides of the bearing-holding carriages 8. The rotor 3 is then rotated very quickly within the toroidal stator 2 resulting in the generation of a magnetic field by the magnets 5. The magnetic field 22 generated by the magnets 5 induces in the solenoid 21 a large amount of electric energy. The fluid 4 enters with high pressure laterally from the inlet duct 16 connected to the right half tube 11 and exits laterally from the outlet duct 17 connected to the left half tube 12 with less pressure because it gives it to the rotor 3 as force and thrust, according to the principle of action and reaction, thereby generating a rotor acceleration which spins very quickly within the stator 2.

In a second operating condition, being the device 1 reversible, it can be used as a high pressure pump or compressor of a fluid 4 such as air or gas or steam or water. This is achieved, in particular, by applying electric energy to the terminations of the toroidal solenoid 21. The electromotive force generated within the solenoid 21 attracts the magnets 5 and consequently rotates the hydraulic blades 57 in the direction of the electric current passing inside the circular spirals of the toroidal solenoid 21, and then into the toroidal stator 2 by rotating the rotor 3. This results in a suction of the fluid 4, which enters the right half tube 11 connected with the inlet duct 16, where valve 64 is connected, which allows the fluid 4 to be introduced in just one direction inside the device 1. The rotor 3, spinning very fast, compresses the fluid 4 and pushes it out of the left half tube 12 connected to the outlet duct 17 where a valve 65 is connected, which prevents the fluid 4 from returning inside the device 1, thus obtaining the device 1 to behave as a compressor or a high pressure pump.

In practice, it has been found that the device for generating electric energy from a pressurized fluid according to the invention is particularly advantageous because it allows different low cost and low environmental impact energy sources to be used, which energy sources will be wasted if not used.

The device according to the invention is very compact and adaptable, controllable and reversible when used as a compressor, depending on the plant and the fluid to be used.

The device for generating electric energy from a pressurized fluid according to the invention is so conceived and illustrated and is subject to numerous modifications and variations, all within the scope of the inventive concept, which can be performed by persons skilled in the art without departing from the scope of the present invention and all details are replaceable by technically equivalent and elements available in the art, thereby ensuring a high degree of reliability.

It is also apparent that the inventive concept underlying the present invention is independent of the actual implementation of the components, which can be made in any form, size and material, and applicable to modern electric devices.

The invention claimed is:

1. A device for generating electric energy from a pressurized fluid comprising a stator, which includes a tubular body on which a solenoid is wound, and a rotor mobile housed inside said tubular body of the stator;
    wherein said rotor comprises a support element and a plurality of hydraulic blades, each provided with a respective magnet and mounted on said support element integral with the support element, said rotor being rotated inside the tubular body of the stator by said pressurized fluid entering the device, so that the magnets of the hydraulic blades generate a magnetic field which induces electric energy in the stator; and
    wherein each blade of said plurality of blades comprises a support of said magnet and a pair of disks for laterally protecting said magnet, said support having a hole for mounting the blade on the support element of the rotor.

2. The device according to claim 1, wherein the tubular body of said stator is of toroidal shape and consists of at least one right half tube and at least one left half tube which are connected therebetween by respective flanges.

3. The device according to claim 2, wherein said support element of the rotor has the shape of a closed ring and consists of at least two ring portions which can be connected by respective connection means.

4. The device according to claim 3, wherein said connection means between said at least two ring portions of the rotor are of magnetic type.

5. The device according to claim 2, wherein an inlet duct of the pressurized fluid into the tubular body of the stator extends from said right half tube and a outlet duct of the fluid from the tubular body of the stator extends from said left half tube.

6. The device according to claim 1, wherein said support element of the rotor has the shape of an open ring.

7. The device according to claim 1, wherein said solenoid comprises a plurality of turns made of conductive material, which are close to one another so that to form one or more conductive coils.

8. The device according to claim 7, wherein each blade of said plurality of blades comprises a protection ring placed externally and all round the magnet.

9. The device according to claim 1, wherein said rotor further comprises a plurality of bearing-holding carriages, each being mounted on said support element and adapted to support at least two bearings, said bearings abutting against an inner wall of the tubular body of said stator.

10. The device according to claim 9, wherein each bearing-holding carriage comprises a semi-cylindrical upper portion and a semi-cylindrical lower portion, which are joined by fixing means and delimit a cavity for housing the support element of the rotor and fixing the bearing-holding carriage on said support element.

11. The device according to claim 1, wherein said rotor further comprises a plurality of band-holding carriages, each being mounted on said support element and adapted to externally supporting at least one elastic band so that the band-holding carriages can slide inside the tubular body of the stator keeping the rotor centered.

12. The device according to claim 11, wherein each band-holding carriage comprises a semi-cylindrical upper portion and a semi-cylindrical lower portion which are joined by fixing means and delimit a cavity for housing the support element of the rotor and fixing the band-holding carriage on said support element.

13. The device according to claim 1, wherein said rotor further comprises a series of spacers, which are mounted by mounting means on said support element between said hydraulic blades, bearing-holding carriages and/or band-holding carriages.

14. The device according to claim 13, further comprising a valve which is fixed to an inlet duct of the fluid and adapted to control the amount of fluid entering the tubular body of the stator and a valve, which is fixed to an outlet duct of the fluid and adapted to control the amount of fluid exiting the tubular body of the stator.

15. The device according to claim 14, wherein said valves are check valves.

16. The device according to claim 1, characterized in that the device is reversible device.

17. The device according to claim 1, wherein the magnet of each blade of the rotor is made of neodymium of other magnetic or super magnetic material.

18. The device according to claim 1, wherein said tubular body of the stator is made of stainless steel.

19. The device according to claim 1, wherein said stator comprises an insulating material which is wound on said tubular body between said tubular body and said solenoid, said solenoid being covered by a layer made of insulating resin.

20. The device according to claim 1, wherein said magnets of said blades have all the same polarity thereby inducing a direct current in said solenoid.

21. The device according to claim 1, wherein groups of hydraulic blades having magnets with one polarity are alternated to groups of hydraulic blades having magnets with opposite polarity, and said solenoid has a series of coils, one for each group of blades, wherein the coils associated to groups of blades having the same polarity are electrically connected to each other.

* * * * *